United States Patent [19]

Gibson et al.

[11] Patent Number: 4,731,508
[45] Date of Patent: Mar. 15, 1988

[54] ELECTROGRAPHIC TOUGH SENSOR HAVING REDUCED BOW OF EQUIPOTENTIAL FIELD LINE THEREIN

[75] Inventors: William A. Gibson, Knox County; John E. Talmage, Jr.; John W. T. Dabbs, both of Anderson County, all of Tenn.

[73] Assignee: Elographics, Inc., Oak Ridge, Tenn.

[21] Appl. No.: 870,848

[22] Filed: Jun. 5, 1986

Related U.S. Application Data

[63] Continuation-in-part of Ser. No. 685,348, Dec. 24, 1984, Pat. No. 4,661,655.

[51] Int. Cl.$^4$ ............................................. G08C 21/00
[52] U.S. Cl. ........................................ 178/18; 382/13
[58] Field of Search ............... 178/18, 19, 20; 382/13, 382/59

[56] References Cited

U.S. PATENT DOCUMENTS

4,493,104  1/1985  Lukis et al. ..................... 178/18 X
4,661,655  4/1987  Gibson et al. ......................... 178/18

Primary Examiner—Stafford D. Schreyer
Attorney, Agent, or Firm—Pitts and Brittian

[57] ABSTRACT

A resistor electrode type touch sensor having enhanced area of linear response by reducing the bow in perimeters of the sensor. Within a resistive layer of substantially uniform resistivity orthogonal electrical fields are produced to give coordinates of a selected position. Overlying, but spaced from, the resistive layer is an optional flexible conductive pick-off sheet facing the resistive layer which will contact the resistive layer when touched at a selected position. Other elements are described to obtain signals corresponding to the coordinates of a selected point. A resistance element is positioned proximate the perimeter of the resistive layer made up of discontinuous conductive lines applied to the resistive layer. For a given value of the resistive layer, the value of the resistance element is determined by the length and width of any gaps between the conductive lines. Electrodes of a selected effective length and spacing are located along selected paths proximate the edges of the resistive layer and attached thereto. Each electrode is connected to selected positions along the resistance element to provide selected voltages to the resistive layer. The effective length and spacing of the electrodes, and the positions of connection to the resistance element, are selected to produce an effective voltage gradient at the electrodes that progressively decreases from corners of the sensor to the center line of each edge of the sensor to counteract any voltage drop along the resistance element when voltages are applied thereto so as to substantially eliminate the bow of electrical fields produced in the resistive layer.

23 Claims, 5 Drawing Figures

ELECTROGRAPHIC TOUGH SENSOR HAVING REDUCED BOW OF EQUIPOTENTIAL FIELD LINE THEREIN

This is a continuation-in-part application based upon parent application, Ser. No. 685,348, filed Dec. 24, 1984, now U.S. Pat. No. 4,661,655.

TECHNICAL FIELD

The present invention relates to devices for inputting or determining the coordinates of a location in a two-dimensional system, and more particularly to an electrographic touch sensor whereby such points can be selected or determined with good linearity throughout an increased proportion of the area of the sensor.

BACKGROUND ART

There are many fields of technology where it is desirable to generate electrical signals that are proportional to some physical point in a two dimensional planar or non-planar coordinate system. For example, it is often desirable to accurately reconstruct graphs or other technical data representation, to store such data in computers, or to provide touch sensors and the like. A device which has come into use for this purpose is known as an electrographic sensor, wherein orthogonal electrical fields are produced, one in a X direction, and one in a Y direction, in the coordinate system. Contact of the sensor at a specific location with a finger or other object causes the generation of a signal that is representative of the X and Y coordinates of that particular point.

Orthogonal X and Y electrical fields of the devices of this type have been generated by numerous types of systems. For example, parallel electrodes have been placed on opposite edges on two spaced apart sheets. The electrical field in one direction is generated in one sheet with a voltage applied to the set of electrodes on that sheet, and the orthogonal field is generated in the second sheet in a similar manner. In another configuration, the orthogonal electrical fields are generated in a single sheet, with various configurations of electrodes along all of the edges of the sheet, with the potential applied to these electrodes in a proper time sequence. One group of single sheet sensors utilize resistive-type electrodes in contrast to another group that utilize diodes.

In the single sheet type apparatus using resistive electrodes, it is well recognized that equipotential lines generated by the electrodes in the center of the sheet are generally straight parallel lines in each of the directions. However, as the perimeter of the sheet is approached, these equipotential lines become non-parallel curved lines. The curvature, i.e., bow, is produced by the voltage drop along resistor network attached to the resistive electrodes in a direction perpendicular to the applied voltages. If a high linearity device is desired in these prior art devices, such can be achieved near the center of the device, but not at the edge of the device because of these non-parallel bowed equipotentials.

In order to achieve high linearity throughout a larger area of the device, many special systems of electrodes have been devised to increase the region of linearity of the instrument. For example, in U.S. Pat. No. 3,798,370, issued to G. S. Hurst on Mar. 19, 1974, (which patent has a common assignee with this application) electrodes for the application of the voltage to the sheet are arranged in a curve or bow whereby the voltage drops in the resistive element along the edges of the device are at least partially compensated. This is discussed with reference to FIG. 2 therein.

In a like manner, special electrode configurations are shown and described in U.S. Pat. No. 4,079,194, issued to V. Kley on Mar. 14, 1978; and in U. S. Pat. No. 4,178,481, issued to the same inventor on Dec. 11, 1979. In both of thse patents, special electrode configurations are used to reduce the bow to increase the sufficiently linear area of a given sized sensor. Another patent that describes special electrode configurations is U.S. Pat. No. 4,293,734, issued to W. Pepper, Jr., on Oct. 6, 1981. This is one of a series of patents issued to Pepper. These electrodes occupy a considerable space along the edge of the sensor (see FIGS. 3 and 8 of Pepper, for example). Also, in Pepper the network disclosed combines both the peripheral resistance network and the electrodes for introducing potentials into the resistive layer whereby a change in one effects the other and thus does not provide individual adjustment.

Still another patent in the general field of "sensors" is U.S. Pat. No. 4,493,104, issued to L. J. Lukis, et al., on Jan. 8, 1985. In that patent is described a unit having a resistive layer (high resistance) bordered by, and in contact with, a strip of material having a medium resistance. This border is provided with "trimming resistors" to produce (as stated in Col. 3, lines 24 and 30), a linear voltage drop and a linear voltage gradient along each edge. These trimming resistors are formed by overlaying a pair of conductors with a small area of the highly resistive material. According to the patent, the linear voltage drop is then achieved by removing either a portion of the resistive overlay or the conductors themselves. A linear voltage drop, as achieved, actually implies bowed equipotential field lines; this then would require some means for reducing the bow to achieve a maximum active area between the edges of the sensor. The patent requires several depositions of materials; the high resistance layer, the medium resistance border, the conductive regions and the resistive overlay.

Numerous sensors of this general type are utilized for use as an overlay to a video display such as a computer terminal in the form of a cathode ray tube. Such displays usually have outwardly curved (convex) edges. Using sensors of the prior art with inwardly extending electrodes, or at least inwardly directed bowed fields on these display devices, reduces the active area of a sensor to less than the potentially available area.

Accordingly, it is an object of the present invention to produce an electrographic sensor for determining planar coordinates with high linearity, such sensors having a minimum area devoted to means for generating electrical fields therein.

It is another object of the present invention to provide a sensor which may be used over the screen of video display devices which results in an optimum utilization of the space thereof.

It is another object of the present invention to provide a single sheet sensor that can be inexpensively produced which will substantially reduce, or eliminate, the bow of equipotential field lines normally found in prior art devices.

One of the principal objects of the present invention is to provide a touch sensor that will provide the above features and is more readily fabricated.

These and other objects of the present invention will become apparent upon the consideration of the following description with reference to the drawings referred to therein.

DISCLOSURE OF THE INVENTION

According to the present invention, there is provided a sheet (or layer) of resistive material having a highly uniform resistivity. This sheet may be either transparent or opaque and is formed using conventional technology. Positioned along and adjacent to this sheet at each edge thereof is a substantially uniform resistance element by which potentials are applied to the sheet. In the preferred embodiment, this resistance element is formed from discontinuous discrete units formed by depositing patterns of conductive material in contact with the resistive material. The sheet is provided with a single line of a plurality of contact electrodes connected to selected positions along the resistive element along each edge, with the size and spacing of these contact electrodes chosen to provide a voltage gradient along the line to achieve a selected degree of linearity of the response throughout a major area of the device. Specifically, the effective voltage gradient along the line is selected to counteract the bow in electrical field lines that otherwise would exist due to voltage drop along the resistive element.

DETAILED DESCRIPTION OF THE INVENTION

Figure 1:
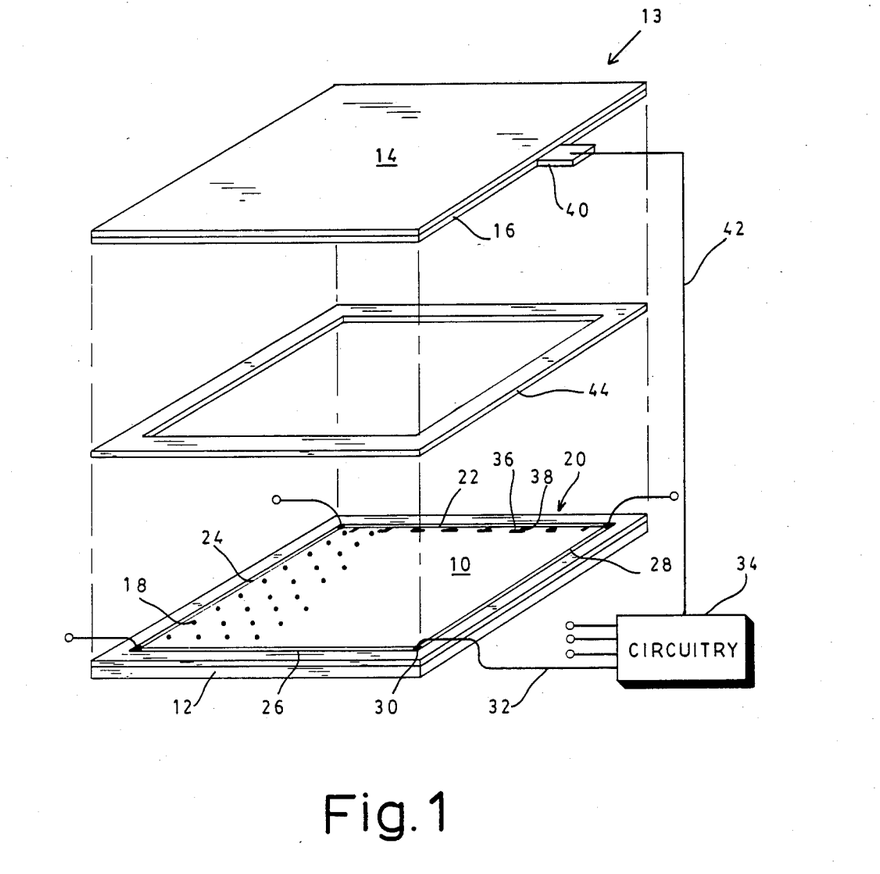
FIG. 1 is an exploded view of a device constructed according to the present invention.

Referring now to FIG. 1, shown therein is an exploded view of a device for accomplishing the above-stated objects. It will be recognized that the thickness (or height) of the components has been exaggerated for purposes of illustration. A uniform resistive surface or layer 10 is applied to a suitable substrate 12. The substrate may be, for example, planar (as shown) or can be contoured to match the face of a curved object, such as a conventional video display screen. The substrate can have any perimeter configuration, e.g., rectangular (as shown) or a configuration to match the configuration of a video display which would include being "substantially rectangular". If the resultant product is to be an opaque sensor, the resistive coating is typically applied by screening a resistive ink, by spraying a resistive paint upon the substrate, or may be a volume conducting sheet such as rubber or plastic. The substrate can typically be rigid plastic, glass, various types of printed circuit board materials, or a metal having a previously applied insulating layer. Furthermore, various plastic materials can be utilized in the form of flexible sheets and supported upon a suitable hard surface material. In such opaque units, the resistive surface typically can have a sheet resistivity between about 10 and 10,000 ohms per square and be applied within a variation of uniformity of about one percent and twenty-five percent, depending upon the positional accuracy requirements of the device.

Alternatively, the resistive surface 10 on substrate 12 can be substantially transparent. For such a device, the resistive layer is typically a semiconducting metal oxide as represented by indium-tin oxide. This type of surface and substrate are described in more detail in U.S. Pat. No. 4,220,815, issued Sept. 2, 1980, which patent is incorporated herein by reference. Typically, this resistive layer has the same range of resistivity as in the opaque sensor described above. The substrate for the transparent sensor is, accordingly, a transparent material such as glass.

Spaced above the resistive coating is a contact or pickoff sheet 13, typically a flexible film 14 having a conductive coating 16 on the underside of the film. If the resultant device is to be transparent, the conductive coating must also be transparent. This transparency requirement does not necessarily apply to a device that is considered an opaque sensor. The flexible film can either be a rigid-like plastic, such as polyester or polycarbonate, or it can be elastomeric. The conductive coating 16 has sufficient flexibility to compliment the flexible film and typically has a sheet resistivity less than about 1,000 ohms per square.

While the embodiment depicted in FIG. 1 utilizes the contact sheet 13, the present invention is not limited to this means for contacting the resistive surface 10. For example, any conducting element, such as a conducting stylus can be used. This is particularly the case when the resistive surface is sufficiently durable as to withstand damage from such contact. Also, a capacitive or resistive pickup system can be used as with a user's finger or an appropriate probe.

The contact sheet, as shown, does prevent any damage to the resistive surface particularly when produced by an ink applied to the surface. Also, it is the most practical means for contacting the resistive surface when the device is to be contacted by a user's finger.

Typically the conductive coating 16 on the pickoff sheet is separated from resistive surface by means whereby accidential contact therebetween cannot occur. These means do permit, however, intentional contact at a particular point using a preselected pressure applied at that point. Preferably, the separating means is a plurality of small dots or islands 18 of insulation as described in the aforementioned U.S. Pat. No. 4,200,815. Alternately, fibers, insulating lines, or other separating means can be used (see, for example, U.S. Pat. No. 3,798,370). It will be recognized by those versed in the art that the conductive coating 16 and the resistive coating can be separated solely by an air gap.

Figure 2:
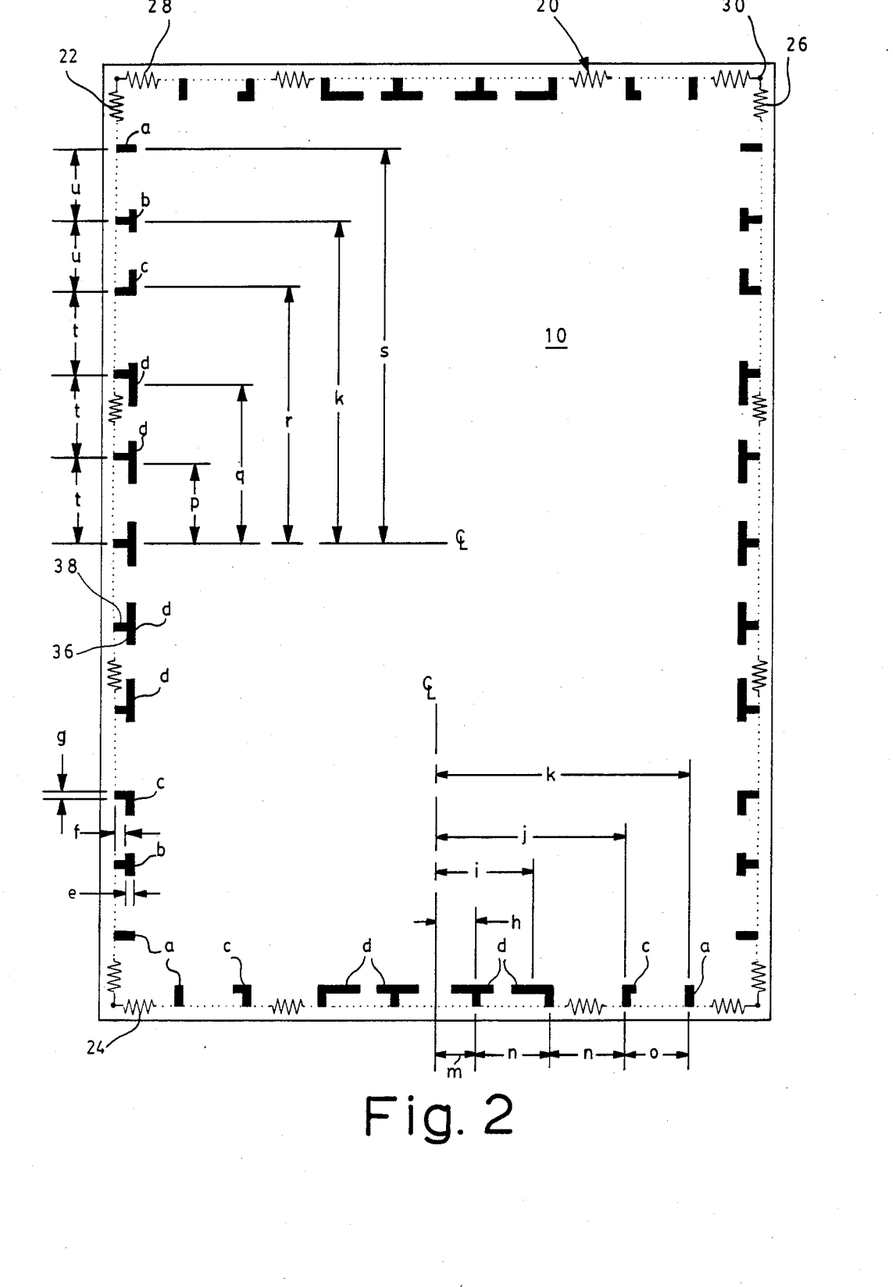
FIG. 2 is a drawing illustrating one embodiment of the application of electrodes of selected varying lenghts and spacing to achieve the present invention.
Figures 4, 4A:
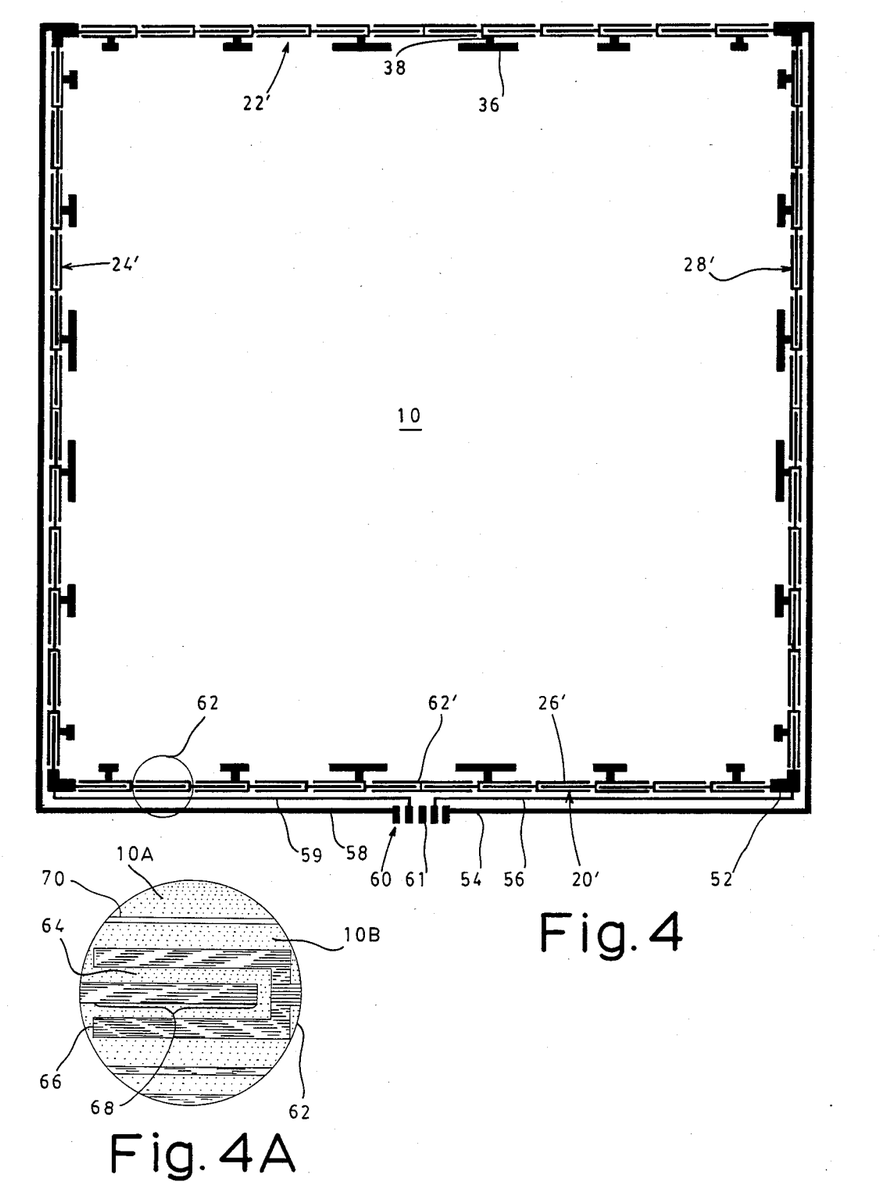
FIG. 4 is a drawing illustrating another embodiment of a resistive element for use with the sensor of FIG. 1.
Figures 5, 5A:
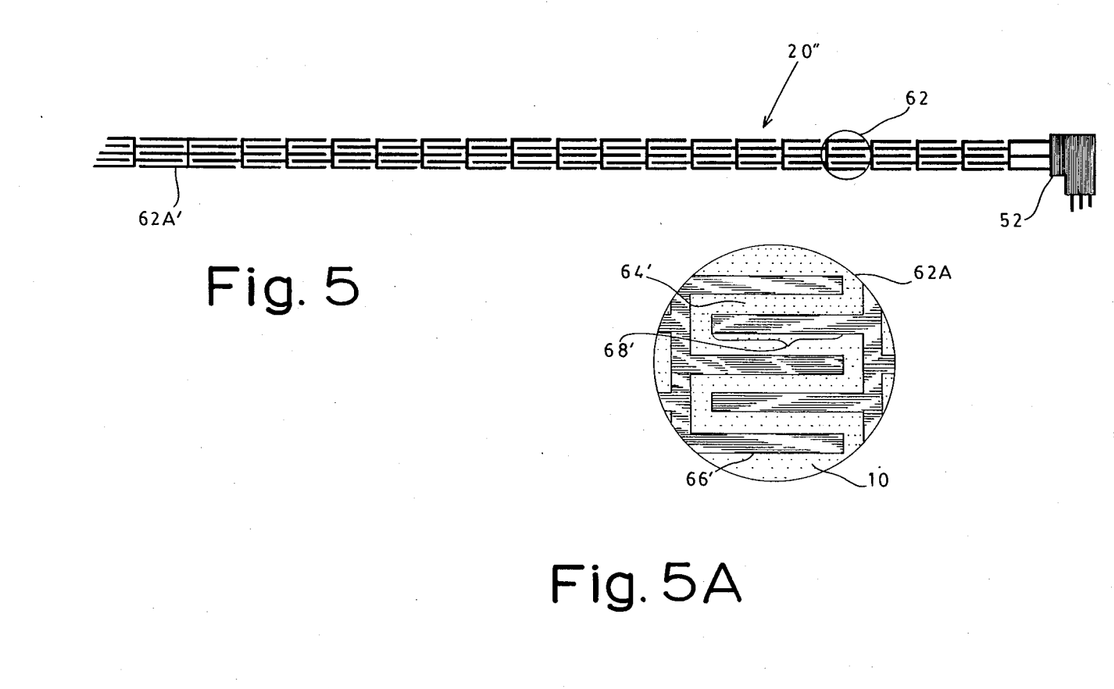
FIG. 5 is a drawing illustrating still another embodiment of a resistive element for the present invention, this being a modification of the embodiment of FIG. 4.

Spaced along each edge of the resistive coating 10 is a resistance element 20 used for applying potentials to the resistive layer so as to create orthogonal electric fields therein. This resistance element can be continuous, as shown in FIGS. 1 and 2, or formed of discrete discontinuous units connected in series as shown in FIGS. 4 and 5. As known to those versed in the art, the value of this resistance element depends upon the resistivity of the coating. Generally the value in ohms per foot is about 0.65 times the resistivity of the resistivity in ohms per square, and thus can vary from about 6.5 to 6500 ohms per foot for the above cited resistivity. The resistance element in the embodiment of FIGS. 1 and 2 is wire made up of four components 22, 24, 26, and 28.

Adjacent ends of each wire component are joined at or near the corners of the resistive coating, as at 30. Each of these corners is provided with an electrical lead, such as 32, whereby the device is connected to conventional circuitry 34 which provides the voltage to the resistance element 20 and which processes information from the device. The elements of this circuitry are well known to those versed in the art.

Along selected paths adjacent each edge of the resistive coating 10, and in contact therewith, are a plurality of electrodes of conductive material, as at 36. The spacing and effective length of the electrodes along each path is chosen so as to achieve varying effective voltage gradients in the resistive coating 10 proximate the electrodes 36 to compensate for the voltage drop along the resistive element. Accordingly, the effective voltage gradients in the coating decrease progressively from corners toward the center of each path as the voltage drop increases along the resistive element 20. These effects (voltage gradient and voltage drop) are made to balance each other so that a substantially straight equipotential field line exists along a line defining the edges of the active region (having ±0.1 inch of better linearity) which will be in close proximity to the electrodes of the sensor. The voltage gradient differences obtained by this construction occur substantially in the area between the electrodes and the edge of the active area.

The effective voltage gradients are a function of the effective length (effective length facing active area) and the spacing of the electrodes. If electrodes of equal effective lengths are used, the spacing is greatest toward the corners of the sensor and substantially less toward the center of each edge. For fabrication simplicity, namely to reduce the number of connections to the resistive element, electrodes can be lengthened toward the center without significantly departing from the ideal. Thus, in FIG. 2, such variation in electrode length is illustrated. As shown, the electrodes closest to the corners have a smaller length dimension (effective length), while those more removed from the corners have a longer dimension. Also, the spacing between electrodes is selected to achieve the desired effective voltage gradients, and thus the desired linear response in the operational area of the sensor. Typically the spacing nearest the corners is the largest, with the spacing decreasing toward the center line of each side. Although substantially rectangular electrodes are illustrated, other configurations (e.g., oval, circular, etc.) are suitable particularly if the electrodes are small in size. These electrodes 36 are individually connected by a lead, as at 38, to the aforementioned resistor element 20 along the corresponding edge. Specific voltage application to each of the electrodes is achieved by the selection of the connection point of the lead 38 on the resistor element 20 such that the desired voltage drop along the resistive element is compensated and the increased effective operative area of the sensor is achieved.

It should be understood that an identical array of electrodes is placed along the opposite edge of the resistive layer, although only one such array is shown in FIG. 1. An electrode array is also applied to the other opposite edges, this array being identical if the device is square. These electrodes typically are physically attached to the resistive surface 10 as by depositing a conductive material, e.g., silver in the appropriate pattern. Furthermore, the device includes an electrode such as at 40, whereby the conductive layer 16 of the aforementioned pickoff sheet 13 can be connected through lead 42 to appropriate external circuitry (as within circuitry 34) for use with the device. The pickoff sheet 13 is typically joined to the remainder of the device with an insulative adhesive frame 44 or the like.

Referring now to FIG. 2, shown therein is an electrode configuration for specifically achieving positional accuracy of about ±0.1 inch throughout the entire active region that closely approaches the electrodes. This unit was constructed to produce an active area of thirteen (13) inches diagonally. Its purpose was for utilization on a thirteen (13) inch (diagonal) video display screen. As shown, the resistive coating 10 had a rectangular configuration for use in this application. The specific sheet resistivity of this coating for this embodiment was about 200 ohms per square. Spaced near the edges of the resistive coating 10 was a resistance element 20 of Nichrome wire of about 2.3 mils diameter, which wire had a linear resistance of about 130 ohms per foot. As indicated previously in FIG. 1, the sections of resistance wire were joined at the corners of the unit as at junction 30. It will be recongnized by persons skilled in the art that the resistance value of the elements immediately adjacent the corners can be adjusted to obtain the proper linearity in the corners of the active area. This adjustment is not shown in this figure. The resistance element 20 was made up of the segments 22, 24, 26, and 28. Applied to the resistive coating 10 were a plurality of electrodes 36 positioned and sized so as to be symmetrical about the center lines of the sides of the unit. Each of these electrodes was connected with a lead 38 to the appropriate segments of the resistance element 20, (e.g., 22). Four sizes (lengths) of electrodes were utilized in this embodiment. These electrodes are designated a, b, c, and d in the drawing. As stated above, electrodes of uniform length can be used; however, the elongated electrodes approximates a similar result and reduces the number of connections to the resistive element. The dimensions of these specific electrodes and their approximate spacing (for the 13 inch unit) are shown in the following table. In addition, the approximate spacing of the electrical leads connecting each of the electrodes to the resistance element 20 are also shown in the table.

TABLE

| a | (length) = 0.06 | inches | k = 3.8 | inches |
|---|---|---|---|---|
| b | (length) = 0.1 | inches | m = 0.5 | inches |
| c | (length) = 0.1 | inches | n = 1.0 | inches |
| d | (length) = 0.5 | inches | o = 1.25 | inches |
| e | = 0.06 | inches | p = 0.8 | inches |
| f | = 0.06 | inches | q = 1.65 | inches |
| g | = 0.06 | inches | r = 2.75 | inches |
| h | = 0.45 | inches | s = 5.0 | inches |
| i | = 1.3 | inches | t = 0.9 | inches |
| j | = 2.5 | inches | u = 1.2 | inches |

A touch sensor constructed utilizing the electrode configuration identified above was tested for determining positional accuracy (linearity). The unit was constructed as generally illustrated in FIG. 1. The conductive layer of the pick-off sheet had a resistivity of 300 ohms per square in this particular embodiment. It was determined that the resultant sensor had a positional accuracy of about ±0.1 inch throughout the entire active or operational region of the sensor, with the active area approaching the electrodes. The result may be contrasted with results using the bowed orientation of electrodes as set forth in the aforementioned U.S.

Figure 3:
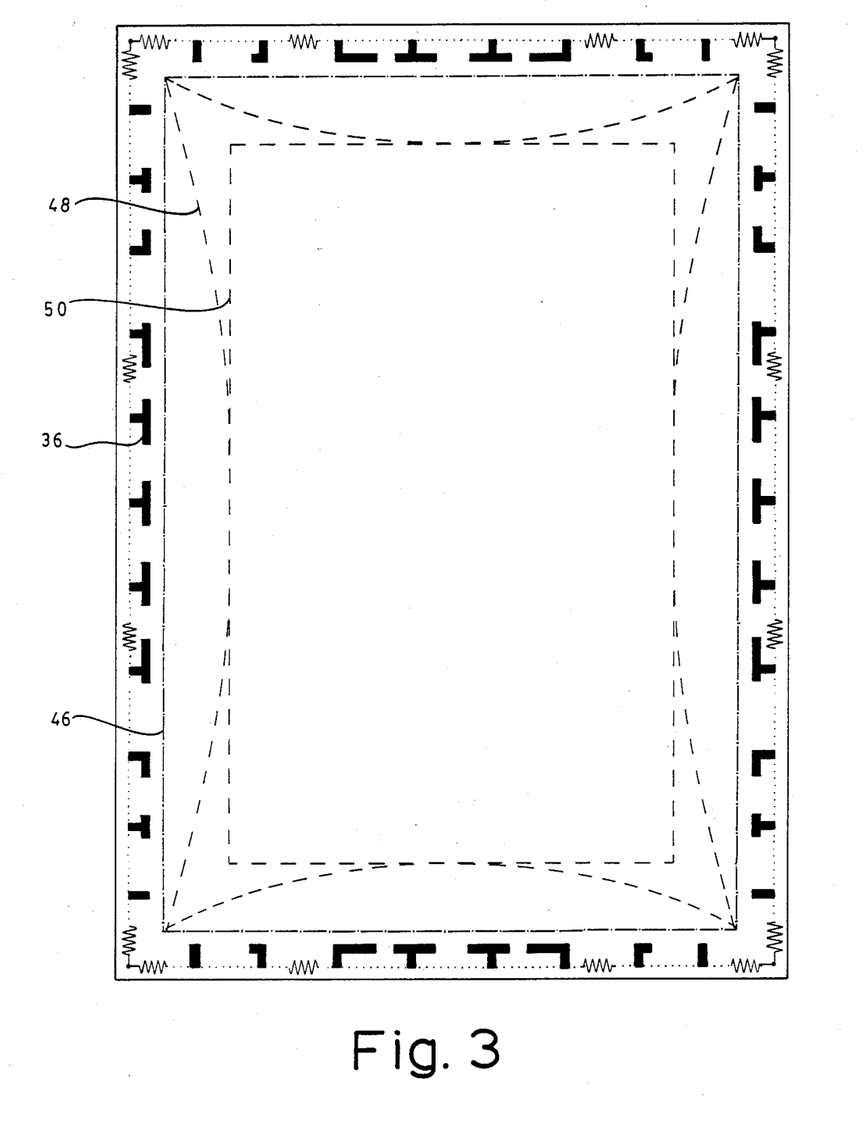
FIG. 3 is a drawing illustrating the enhancement of the active area of a sensor as achieved with the present invention contrasted with typical sensors of the prior art.

Pat. No. 3,798,370. In that construction and using the resistances discussed herein, there would have been a bow in the electrode configuration of about 1.75 inches in the long dimension of the sensor and almost a one-inch bow in the shorter dimension. The amount of bow is proportional to the ratio of the resistance of the wire (or its equivalent) divided by the resistance of the sheet, multiplied by the square of the length of the side. Thus, for the same size of total sensor structure of the prior art it would have an effective active area of only about eight inches diagonally instead of the thirteen inches as demonstrated by the present invention. This comparison is illustrated in FIG. 3. The active area of the present invention is indicated by the dashed line 46. Without this invention, there would be a bow as indicated at 48, and the active area would be defined by the dashed rectangle 50.

As indicated above, the number of the electrodes utilized along an edge of a sensor is generally proportional to the length of that edge, and to the resistivity of the resistive element. The specific length, number and spacing is selected to compensate for the voltage drop along the resistive element during operation of the sensor. Thus, the actual values (number, length, spacing) are dependent upon the specific resistance of the resistive element used to produce the fields in the sensor.

As shown in FIG. 1 and discussed above, the resistance element to which the electrodes are connected in one embodiment is in the form of a uniform wire having a resistance (ohms per foot) approximately 0.65 times the resistivity (ohms per square) of the resistive layer. The use of this wire produces a satisfactory sensor. It does, however, make the manufacture of the sensor more difficult than is desired. For example, the wire must be fastened to the substrate and each electrode must be securely fastened (soldered) to the wire at the selected positions. When a change in the resistivity of the resistive coating is made, wire of a different resistance per unit length is required.

One method of fabrication of the invention to overcome the problem associated with using a wire is to use an array of discontinuous conductive lines in contact with the resistive layer or element. The resistance value for such an array is determined by the value of the resistive layer and by the length and spacing of a gap between the conductive lines. For conductive lines that overlap, for example, the resistance value per unit length (for a given resistivity) is established by the ratio of the distance across the gap divided by the length of mutual overlap. The frequency of the pattern of discrete units affects the total resistance along an edge of the sensor. A large number of patterns of conductive lines are potentially useful.

One of the objects of the invention is to minimize the space taken up by the resistance element along each edge of the sensor, and yet obtain the desired value of unit resistance relative to the resistivity of the resistive coating. Also, the choice must permit sufficiently accurate resistance values within the bounds of ease of fabrication.

For these and other fabrication reasons, a resistance element for the edge of the sensor of the configurations shown in FIGS. 4 and 5 was developed. Referring first to FIG. 4, shown therein is resistance element 20' which is referred to as the "Y" or "pitchfork" configuration, spaced around the perimeter of the sensor. This configuration produces the lowest resistance along the line with the greatest gap for reproducibility. The total resistance element 20' is made up of the four segments 22', 24', 26' and 28' in a manner similar to FIG. 1. The adjacent corners of the segments are joined as at 52. Appropriate trace leads 54, 56, 58, 59 connect the corners to a connector 60. Pin 61 of the connector 60 is connected to the contact sheet (not shown) spaced above the resistive layer 10.

Within each of these resistance element segments, there is a plurality of identical discontinuous units 62 (except at the center as will be discussed) made up of conductive material applied (as with screen techniques) to the layer of resistive material 10. Each unit has a center portion substantially perpendicular to the perimeter edge of the resistive layer and two legs extend in one direction and one leg extends in an opposite direction, with the legs being substantially parallel to the edge. The two legs of one unit are interleaved with the single leg of the adjacent unit. The resistance produced for each unit is a function of the spacing 64 between facing legs 66 of the Y, the overlapping length 68 of the legs (see insert of FIG. 4) and the value of resistivity of the resistive coating.

In a typical configuration, the width of each leg 66 is 0.02 inch, the spacing 64 between legs within each unit 62 is 0.02 inch, and the repetition pattern is 0.5 inch, with 0.03 inch spacing (in direction of the legs) between legs of adjacent unit. With this pattern applied to a resistive coating of 200 ohms/square, the linear resistance of a resistance segment (along one edge) is about 11 ohms/inch. An important feature is that the linear resistance of the resistance segment varies properly in relationship to the resistivity of the coating such that once a proper relationship is established, the linear resistance will automatically become correct for whatever resistivity is chosen for the coating 10.

In order for the resistance element 20' to have symmetry along each edge (a desirable but not critical property), a specially constructed central unit 62' is provided. The spacings between the legs and the width of the legs is identical to the other units. When the repetition pattern for the other units is 0.5 inch, the central unit 62' has a length of about 0.8 inch. Since the total width of the resistance element is only about 0.1 inch, a very small border is utilized for the elements to produce orthogonal electrical fields in the resistive coating 10. Furthermore, this border is easily covered with a bezel of a video display, and the absence of a bow in equipotential lines enables essentially all of the visible area to be the active area of the touch sensor.

As in the previously described embodiment, electrodes 36 are joined by a connector 38 to the resistance element 20'. The effective length and spacing of the electrodes, and the positions of their attachment to the resistance element, compensate for voltage drop along the resistance element perpendicular to current flow in the resistive layer 10 and thereby substantially eliminates any bow in equipotential lines generated in the resistive coating.

The structure illustrated in FIG. 4 is more easily fabricated than that of the embodiment using a wire for the resistance element. The discontinuous resistance element 20', the electrodes 36 and the connectors 38 can all be placed on the surface of the resistive coating 10 in a single step by any suitable method, such as screen printing because they are all conductive. Even the lead traces 54, 56, 58 and 59 can be applied in the same manner. The only solder steps are those needed join the traces to the connector 60. Alternatively, all of the conductive portions (e.g., electrodes 36, connector 38, components for the resistance elements, and the lead traces) can be applied to the substrate and the resistive coating 10 then applied.

There may be instances where the close spacing and size (0.02 inch) of the legs of resistance element units 62, 62' cannot be controlled accurately by screen printing such as on curved surfaces. In those instances, the embodiment illustrated at 20" in FIG. 5 can be used. This is referred to as the "E" configuration. Typically all of the gaps 64' are increased to 0.03 inch, this size being more controllable under adverse conditions. The individual unit 62A has five interlocking legs 66'; three in one direction and two in the other. In order to obtain the same unit resistance as in the embodiment of FIG. 4, the length 68' of the legs is shortened whereby the repeat pattern is 0.36 inch. As with the embodiment of FIG. 4, the correct linear resistance is automatically produced on any value of resistivity of the coating. The total width of a resistance element of this configuration is only about 0.22 inch.

In either of the embodiments of FIGS. 4 or 5, the resistive coating located beween the resistance elements 22', 22" and the electrodes may affect the potential on any specific electrode. A method of preventing undesirable current flow between the resistance elements 20' or 20" to electrodes is to form a line of discontinuity, where there is no resistive coating, between the resistance elements and the electrodes. As illustrated at 70 in the enlarged portion of FIG. 4, this produces a central resistive area 10A and a peripheral resistive area 10B, preferably both having the same resistivity. This can be accomplished by either not depositing any resistive coating along that line or removing the coating after application. In either case, the connectors 38 span the line so as to connect the electrodes 36 to the resistance elements 20', 20".

In all of the figures, the electrodes along each edge are shown as being aligned in a straight path. This is only, however, a most general construction. An alternate convex path can be used to match, for example, the aforementioned curvature along the edges of a conventional computer video display. With such a convex path of electrodes, such electrodes would be hidden behind the bezel of the display. The effective voltage gradient would be adjusted in the same manner to provide an enlarged linear area.

From the foregoing, it may be seen that a position sensitive device has been achieved having increased positional accuracy (linearity) over a greater portion of a device of given size. This permits the simplified fabrication of a smaller device for a given area of uniform sensitivity. Although only certain specific embodiments are described herein, it will be recognized by persons versed in the art that the teachings contained herein will permit the fabrication of other devices which will perform as described. For example, the present invention is applicable for use on the sensor described in copending patent application (having a common assignee) Ser. No. 710,080 filed Mar. 11, 1985. Also, as stated above, the embodiments described herein can use means other than a contact sheet for obtaining signals related to the X and Y coordinates of a selected point. Furthermore, the method of eliminating or reducing bowed equipotential lines at the perimeter of the active area of the sensor will be understood by persons skilled in the art upon a consideration of this description. Accordingly, this invention is limited only by the claims and equivalents of the claims that are appended hereto.

We claim:

1. A position touch sensor having resistive electrodes which provides a linear output response over an enhanced proportion of the surface area of said sensor by reducing the bow of equipotential lines along edges of said sensor, which comprises:

a resistive layer having a selected substantially uniform resistivity throughout said layer, said resistive layer defining perimeter edges;

a resistance element positioned proximate each of said perimeter edges of said resistive layer for providing orthogonal electrical fields to said resistive layer, each of said resistance elements having opposite ends joined to proximate ends of adjoining resistance elements, each of said resistance elements comprising a plurality of substantially identical discontinuous units in electrical contact with said resistive layer, each of said units formed by at least one line of conductive material spaced from a line of conductive material of an adjacent unit to define a separation gap of a selected width and length whereby said width and length of said gap and said resisitivity of said resistive layer establish a unit resistance value for said units;

a plurality of electrodes positioned on, and electrically connected to, said layer along a preselected symmetrical path proximate each perimeter edge of said layer, said electrodes each being electrically connected to selected positions along said resistance elements and having a selected center-to-center spacing and each electrode having an effective length along said path, said length and spacing of said electrodes, and said positions of connection of said resistance elements selected to produce a selected voltage gradient along said path of said electrodes to compensate for any voltage drop along said resistance element during operation of said sensor when said orthogonal fields are introduced into said resistive layer whereby said bow is reduced; and means for deriving output signals corresponding to coordinates of a selected point on said resistive layer.

2. The sensor of claim 1 wherein said means for deriving output signals is a capacitive element to be placed adjacent said resistive layer at said selected point.

3. The sensor of claim 1 wherein said means for deriving output signals comprises a circuit connected to said ends of said resistance elements to introduce orthogonal electrical fields in said resistive layer and a conductive means for contacting said resistive layer at said selected point to obtain voltage signals from said resistive layer at said point.

4. The sensor of claim 1 wherein said at least one line of conductive material of a unit overlaps at least one line of conductive material of said adjacent unit a selected distance whereby said gap is defined by spacing between said overlapped lines and said selected distances.

5. The sensor of claim 3 wherein said conductive means is a conductive flexible pickoff sheet uniformly spaced from said resistive layer and further comprises means for preventing inadvertent contact between said pickoff sheet and said resistive layer but permitting intentional contact at said selected point.

6. The sensor of claim 4 wherein said overlapped lines of conductive material are parallel to each other and to said perimeter edge of said resistive layer.

7. A position touch sensor having resistive electrodes which provides a linear output response over an enhanced proportion of the surface area of said sensor by reducing the bow of equipotential lines along edges of said sensor, which comprises:

a resistive layer having a selected substantially uniform resistivity throughout said layer, said resistive layer defining perimeter edges;

a resistance element positioned proximate each of said perimeter edges of said resistive layer for providing orthogonal electrical fields of said resistive layer, each of said resistance elements having opposite ends joined to proximate ends of adjoining resistance elements, each of said resistance elements comprising a plurality of substantially identical discontinuous and overlapping conductive units in electrical contact with said resistive layer, each of said units formed by at lease two parallel legs of a selected length in one direction substantially aligned along said edges, and at least one leg of said selected length in a second direction substantially aligned along said edges, said at least two legs electrically connected to said at least one leg, said at least two legs of one unit interleaved with said at least one leg of an adjacent unit, said legs of one unit separated from legs of the other a selected distance, said selected length and selected distance defining a selected resistance value along said resistance element with relationship to said resistivity of said resistive layer;

a plurality of electrodes positioned on, and electrically connected to, said layer along a preselected symmetrical path proximate each perimeter edge of said layer, said electrodes each being electrically connected to selected positions along said resistance elements and having a selected center-to-center spacing and each electrode having an effective length along said path, said length and spacing of said electrodes, and said positions of connection to said resistance elements selected to produce a selected voltage gradient along said path of said electrodes to compensate for any voltage drop along said resistance element during operation of said sensor when said orthogonal fields are introduced into said resistive layer whereby said bow is reduced; and means for deriving output signals corresponding to coordinates of a selected point on said resistive layer.

8. The sensor of claim 7 wherein all of said units in each of said resistance elements are substantially identical, provided, however, said units in each resistance element are arranged as a mirror image centered at a midpoint between said opposite ends, with a center unit at said midpoint formed by at least two parallel legs of said selected length in one direction and at least two parallel legs of said selected length in an opposite direction, said legs of said center unit electrically connected and substantially aligned along said edge.

9. The sensor of claim 8 wherein each said substantially identical units and said center unit have a center conductive portion substantially perpendicular to an adjacent one of said edges, and said legs project substantially perpendicular to said center portion.

10. The sensor of claim 9 wherein said substantially identical units are substantially Y-shaped whereby two legs of one unit are interleaved with one leg of an adjacent unit and said center unit is substantially H-shaped whereby two legs on each side of said center portion are interleaved with one leg of each adjacent unit.

11. The sensor of claim 8 wherein each of said substantially identical units has three legs projecting from said center portion in one direction and two legs projecting in the opposite direction whereby said three legs of one unit are interleaved with said two legs of an adjacent unit, and wherein said center unit has three legs projecting in either direction from said center portion.

12. The sensor of claim 7 wherein said resistive layer is divided into a central portion and a peripheral portion by a line of electrical discontinuity, said conductive units forming said resistance elements being electrically in contact with said peripheral portion and said electrodes being electrically in contact with said central portion.

13. The sensor of claim 7 wherein said selected effective length of said electrodes in each of said paths effectively increases from each end of said path toward a centerline of said path, and said selected spacing between adjacent electrodes in each of said paths effectively decreases from each end of said path toward said centerline of said path to thereby progressively decrease effective voltage gradients produced by said electrodes in said resistive layer toward said centerline of said paths.

14. A single sheet resistor type touch sensor which exhibits substantially reduced bow of the electric equipotential lines along edges thereof, which comprises:

a substantially rectangular substrate having an upper and a lower face;

a uniform resistive coating applied to a substantial portion of said upper face of said substrate, said resistive coating having a resistivity of between about 10 and about 10,000 ohms per square and defining perimeter edges having corners;

a resistance element proximate each of said perimeter edges of said coating, said resistance elements having a resistance of about 6.5 to about 6500 ohms per foot, each resistance element joined to ends of adjoining resitance elements proximate said corners of said coating, each of said resistance elements comprising a plurality of substantially identical discontinuous and overlapping conductive units in electrical contact with said resistive coating, each of said units formed by at least two parallel legs of a selected length in on direction substantially aligned along said edges, and at least one leg of said selected length in a second direction substantially aligned along said edges, said at least two legs electrically connected to said at least one leg, said at least two legs of one unit interleaved with said at least one leg of an adjacent unit, said legs of one unit separated from legs of the adjacent unit a selected distance, said selected length and selected distance defining a selected linear resitance value along said resistance element with relationship to said resistivity of said resistive coating;

circuitry attached to said junctions of said resistance elements to apply voltages to said resistance elements to produce orthogonal electric fields in said resistive coating;

a plurality of conductive electrodes on, and in electrical contact with, said resistive coating aligned in a single path proximate said perimeter edges, said electrodes having a spacing and an effective length along said path whereby said electrodes produce an effective voltage gradient in said resistive coating which progressively decreases from proximate said corners to centerlines of said path to counteract voltage drop along said resistance elements due to said applied voltages from said circuitry and thereby substantially reduces any bow in equipotential lines produced in said resistive coating by said applied voltages to said resistance elements; and means for deriving output signals corresponding to coordinates of a selected point on said resistive coating.

15. The sensor of claim 14 wherein all of said units in each of said resistance elements are substantially identical, provided, however, said units in each resistance element are arranged as a mirror image centered at a midpoint between said opposite ends with a center unit at said midpoint formed by at least two parallel legs of said selected length in one direction and at least two parallel legs of said selected length in an opposite direction, said legs of said center unit electrically connected and substantially aligned along said edge.

16. The sensor of claim 14 wherein each said substantially identical units and said center unit have a center conductive portion substantially perpendicular to an adjacent one of said edges, and said legs project substantially perpendicular to said center portion.

17. The sensor of claim 15 wherein said substantially identical units are substantially Y-shaped whereby two legs of one unit are interleaved with one leg of an adjacent unit and said center unit is substantially H-shaped whereby two legs on each side of said center portion are interleaved with one leg of each adjacent unit, and wherein said selected length of said legs is 0.5 inch, and said selected distance between said legs is 0.02 inch.

18. The sensor of claim 16 wherein each of said substantially identical units has three legs projecting from said center portion in one direction and two legs projecting in the opposite direction whereby said three legs of one unit are interleaved with said two legs of an adjacent unit, and wherein said center unit has three legs projecting in either direction from said center portion, and wherein said selected length of said legs is 0.36 inch, and said selected distance between legs is 0.03 inch.

19. The sensor of claim 14 wherein said means for deriving said output signals is a flexible pick-off sheet spaced uniformly from and proximate said resistive coating, said pick-off sheet having a conductive layer of about 300 ohms per square facing said resistance coating, and a plurality of small insulating dots interposed between said resistive coating and said conductive layer to prevent inadvertent contact therebetween but permit contact when pressure is intentionally applied to said pick-off sheet.

20. The sensor of claim 14 wherein said legs of each of said conductive units are about 0.35 to 0.5 in. long and are spaced from legs of said adjacent conductive unit a distance of about 0.002 to 0.003 in.

21. A position touch sensor having resistive electrodes which provides a substantially linear output response over the total area of said sensor by substantially reducing the bow of equipotential lines along edges of said sensor, said equipotential lines produced when electric fields are introduced into said sensor, which comprises:

a resistive layer having a selected substantially uniform resistivity throughout said layer, said resistive layer defining perimeter edges;

a resistance element positioned proximate each of said perimeter edges of said resistive layer for providing orthogonal electrical fields to said resistive layer, each of said resistance elements having opposite ends joined to proximate ends of adjoining resistance elements, each of said resistance elements comprising a plurality of discontinuous units in electrical contact with said resistive layer, each of said units formd by at least one line of conductive material spaced from a line of conductive material of an adjacent unit to define a separation gap of a selected width and length whereby said width and length of said gap and said resistivity of said resistive layer establish a unit resistance value for said units;

a plurality of electrodes positioned on, and electrically connected to, said resistive layer along a preselected symmetrical path proximate each perimeter edge of said layer, said electrodes each being electrically connected to selected positions along said resistance elements to introduce orthogonal electric fields in said resistive layer, said electrodes having a selected spacing and each electrode having an effective length along said path, said spacing and effective length of said electrodes selected to produce a selected voltage gradient at each of said electrode to compensate for any cumulative voltage drop along said resistance element perpendicular to current flow through said resistive layer during operation of said sensor when said orthogonal fields are introduced into said resistive layer whereby said bow of said equipotential lines is substantially reduced; and means for deriving output signals corresponding to coordinates of a selected point on said resistive layer.

22. A position touch sensor having resistive electrodes which provides a substantially linear output response over the total area of said sensor by substantially reducing the bow of equipotential lines along edges of said sensor, said equipotential lines produced when electric fields are introduced into said sensor, which comprises:

a resistive layer having a selected substantially uniform resistivity throughout said layer, said resistive layer defining perimeter edges;

a resistance element positioned proximate each of said perimeter edges of said resistive layer for providing orthogonal electrical fields to said resistive layer, each of said resistance elements having opposite ends joined to proximate ends of adjoining resistance elements, each of said resistance elements comprising a plurality of discontinuous and overlapping conductive units in electrical contact with said resistive layer, each of said units formed by at least two parallel legs of a selected length in one direction substantially aligned along said edges, and at least one leg of said selected length in a second direction substantially aligned along said edges, said at least two legs electrically connected to said at least one leg, said at least two legs of one unit interleaved with said at least one leg of an adjacent unit, said legs of one unit separated from legs of the other unit a selected distance, said selected length and selected distance of said legs defining a selected resistance value along said resistance element with relationship to said resistivity of said resistivity layer;

a plurality of electrodes positioned on, and electrically connected to, said layer along a preselected symmetrical path proximate each perimeter edge of said resistive layer, said electrodes each being electrically connected to selected positions along said resistance elements to introduce orthogonal fields in said resistive layer, said electrodes having a selected spacing and each electrode having an effective length along said path, said spacing and effective length of said electrodes selected to produce a selected voltage gradient at each of said electrodes to compensate for any cumulative voltage drop along said resistance element perpendicular to current flow through said resistive layer during operation of said sensor when said orthogonal fields are introduced into said resistive layer whereby said bow of said equipotential lines is reduced; and means for deriving output signals corresponding to coordinates of a selected point on said resistive layer.

23. A single sheet resistor-type touch sensor which exhibits substantially reduced bow of the electric equipotential lines along edges thereof, said equipotential lines produced when electric fields are introduced into said sensor, which comprises:

a substantially rectangular substrate having an upper and a lower face;

a uniform resistive coating applied to a substantial portion of said upper face of said substrate, said resistive coating having a resistivity of between abvout 10 and about 10,000 ohms per square and defining perimeter edges having corners;

a resistance element proximate each of said perimeter edges of said coating, said resistance elements having a selected resistance in ohms per foot of about 0.65 times said resistivity of said resistive coating, each resistance element joined to ends of adjoining resistance elements proximate said corners of said coating, each of said resistance elements comprising a plurality of discontinuous and overlapping conductive units in electrical contact with said resistive layer, each of said units formed by at least two parallel legs of a selected length in one direction substantially aligned along said edges and at least one leg of said selected length in a second direction substantially aligned along said edges, said at least two legs electrically connected to said at least one leg, said at least two legs of one unit interleaved with said at least one leg of an adjacent unit, said legs of one unit separated from legs of the adjacent unit a selected distance defining said selected resistance value along said resistance element with relationship to said resistivity of said resistive layer;

circuitry attached to the junctions of said resistance elements to apply voltages to said resistance elements to produce orthogonal electric fields in said resistive coating;

a plurality of conductivity electrodes, on, and in electrical contact with said resistive coating, and aligned in a single path proximate said perimeter edges of said coating, said electrodes having a spacing and an effective length along said path whereby said electrodes produce an effective voltage gradient at each of said electrodes which progressively decreases from proximate said corners to centerlines of said path to counteract a cumulative voltage drop along said resistance elements perpendicular to current flow through said resistive coating and thereby substantially reduce any bow in equipotential lines produced in said resistive coating by said applied volltages to said resistance elements; and means for deriving output signals corresponding to coordinates of a selected point on said resistive coating.

* * * * *

REEXAMINATION CERTIFICATE (3033rd)

United States Patent [19]
Gibson et al.

[11] B1 4,731,508
[45] Certificate Issued Oct. 29, 1996

[54] ELECTROGRAPHIC TOUGH SENSOR HAVING REDUCED BOW OF EQUIPOTENTIAL FIELD LINE THEREIN

[75] Inventors: William A. Gibson, Knox County; John E. Talmage, Jr.; John W. T. Dabbs, both of Anderson County, all of Tenn.

[73] Assignee: Elographics, Inc., Anderson, Tenn.

Reexamination Request:
No. 90/004,005, Oct. 16, 1995

Reexamination Certificate for:
Patent No.: 4,731,508
Issued: Mar. 15, 1988
Appl. No.: 870,848
Filed: Jun. 5, 1986

Related U.S. Application Data

[63] Continuation-in-part of Ser. No. 685,348, Dec. 24, 1984, Pat. No. 4,661,655.

[51] Int. Cl.⁶ .................................................. G08C 21/00
[52] U.S. Cl. ........................................... 178/18; 382/315
[58] Field of Search .................................. 178/18, 19, 20, 178/87; 382/119, 312, 315; 395/156, 157, 173, 174

[56] References Cited

U.S. PATENT DOCUMENTS

| | | | |
|---|---|---|---|
| 3,632,874 | 1/1972 | Malavard et al. | 178/18 |
| 3,798,370 | 3/1974 | Hurst | 178/18 |
| 4,071,689 | 1/1978 | Talmage et al. | 178/18 |
| 4,198,539 | 4/1980 | Pepper, Jr. | 178/18 |
| 4,220,815 | 9/1980 | Gibson et al. | 178/18 |
| 4,493,104 | 1/1985 | Lukis et al. | 382/13 |

*Primary Examiner*—Wellington Chin

[57] ABSTRACT

A resistor electrode type touch sensor having enhanced area of linear response by reducing the bow in perimeters of the sensor. Within a resistive layer of substantially uniform resistivity orthogonal electrical fields are produced to give coordinates of a selected position. Overlying, but spaced from, the resistive layer is an optional flexible conductive pick-off sheet facing the resistive layer which will contact the resistive layer when touched at a selected position. Other elements are described to obtain signals corresponding to the coordinates of a selected point. A resistance element is positioned proximate the perimeter of the resistive layer made up of discontinuous conductive lines applied to the resistive layer. For a given value of the resistive layer, the value of the resistance element is determined by the length and width of any gaps between the conductive lines. Electrodes of a selected effective length and spacing are located along selected paths proximate the edges of the resistive layer and attached thereto. Each electrode is connected to selected positions along the resistance element to provide selected voltages to the resistive layer. The effective length and spacing of the electrodes, and the positions of connection to the resistance element, are selected to produce an effective voltage gradient at the electrodes that progressively decreases from corners of the sensor to the center line of each edge of the sensor to counteract any voltage drop along the resistance element when voltages are applied thereto so as to substantially eliminate the bow of electrical fields produced in the resistive layer.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–23 is confirmed.

\* \* \* \* \*